(12) United States Patent
Skvortsov et al.

(10) Patent No.: US 9,509,750 B2
(45) Date of Patent: *Nov. 29, 2016

(54) APPARATUS AND METHOD FOR PROVIDING CONTENT

(71) Applicant: SAMSUNG ELECTRONICS CO., LTD., Suwon-si (KR)

(72) Inventors: Vladimir Skvortsov, Yongin-si (KR); Jong-ho Lee, Yongin-si (KR); Yeun-bae Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 32 days.

This patent is subject to a terminal disclaimer.

(21) Appl. No.: 14/282,582

(22) Filed: May 20, 2014

(65) Prior Publication Data

US 2014/0258361 A1    Sep. 11, 2014

Related U.S. Application Data

(63) Continuation of application No. 12/149,752, filed on May 7, 2008, now Pat. No. 8,769,066.

(30) Foreign Application Priority Data

Oct. 16, 2007    (KR) .......................... 10-2007-0104100

(51) Int. Cl.
*G06F 21/00* (2013.01)
*H04L 29/08* (2006.01)
(Continued)

(52) U.S. Cl.
CPC ............... *H04L 67/02* (2013.01); *G06F 9/485* (2013.01); *G06F 17/30893* (2013.01);
(Continued)

(58) Field of Classification Search
CPC .... G06F 17/20893; G06F 3/14; G06F 9/485; G06G 2340/0407; G06G 2350/00; H04L 67/02; H04L 67/26; H04N 21/4316; H04N 21/4622; H04N 21/6125
See application file for complete search history.

(56) References Cited

U.S. PATENT DOCUMENTS

| | | | |
|---|---|---|---|
| 6,724,403 B1 | 4/2004 | Santoro et al. | |
| 6,728,960 B1 * | 4/2004 | Loomans | G06F 9/4843 709/203 |

(Continued)

FOREIGN PATENT DOCUMENTS

| | | |
|---|---|---|
| KR | 10-2001-0028861 | 4/2001 |
| KR | 2001-0047930 | 6/2001 |

(Continued)

OTHER PUBLICATIONS

Korean Office Action mailed Jan. 13, 2015 in related Korean Application No. 10-2014-0144314.

(Continued)

*Primary Examiner* — Chau Le
(74) *Attorney, Agent, or Firm* — Staas & Halsey LLP

(57) ABSTRACT

An apparatus and method for providing content is provided, which performs a web service initialization through a provided local offline web server and manages a plurality of content provided through a multithreaded web service. The apparatus for providing content includes a communication unit receiving one or more sets of content; a thread creation unit creating one or more threads that are given to the content to process a work; and a page creation unit having a frame per thread and creating an image page for playing the content on a web browser.

16 Claims, 8 Drawing Sheets

(51) Int. Cl.
  *G06F 9/48* (2006.01)
  *G06F 17/30* (2006.01)
  *H04N 21/431* (2011.01)
  *H04N 21/462* (2011.01)
  *H04N 21/61* (2011.01)
  *G06F 3/14* (2006.01)

(52) U.S. Cl.
  CPC ......... *H04L 67/26* (2013.01); *H04N 21/4316* (2013.01); *H04N 21/4622* (2013.01); *H04N 21/6125* (2013.01); *G06F 3/14* (2013.01); *G09G 2340/0407* (2013.01); *G09G 2350/00* (2013.01)

(56) References Cited

U.S. PATENT DOCUMENTS

| | | | |
|---|---|---|---|
| 7,137,115 B2 | 11/2006 | Sakamoto et al. | |
| 7,567,800 B2 | 7/2009 | Uematsu et al. | |
| 2003/0188139 A1* | 10/2003 | Chrysos | G06F 9/3824 712/225 |
| 2004/0139432 A1* | 7/2004 | Bender | G06F 9/485 718/100 |
| 2004/0187120 A1* | 9/2004 | Moore | G06F 9/4881 718/100 |
| 2007/0101258 A1 | 5/2007 | Xu et al. | |
| 2007/0260741 A1 | 11/2007 | Bezancon | |
| 2008/0052630 A1 | 2/2008 | Rosenbaum et al. | |
| 2008/0244644 A1 | 10/2008 | McCausland | |
| 2008/0310408 A1 | 12/2008 | Thompson et al. | |
| 2009/0183167 A1* | 7/2009 | Kupferschmidt | G06F 9/5027 718/104 |

FOREIGN PATENT DOCUMENTS

| | | |
|---|---|---|
| KR | 10-2001-0068478 | 7/2001 |
| KR | 10-2006-0039558 | 5/2006 |

OTHER PUBLICATIONS

U.S. Office Action mailed Dec. 23, 2009 in copending U.S. Appl. No. 12/149,752.
U.S. Final Office Action mailed Jun. 22, 2010 in copending U.S. Appl. No. 12/149,752.
U.S. Advisory Action mailed Oct. 5, 2010 in copending U.S. Appl. No. 12/149,752.
U.S. Office Action mailed Jun. 22, 2011 in copending U.S. Appl. No. 12/149,752.
U.S. Final Office Action mailed Jan. 5, 2012 in copending U.S. Appl. No. 12/149,752.
U.S. Office Action mailed Jul. 17, 2012 in copending U.S. Appl. No. 12/149,752.
U.S. Final Office Action mailed Mar. 26, 2013 in copending U.S. Appl. No. 12/149,752.
U.S. Advisory Action mailed Jul. 16, 2013 in copending U.S. Appl. No. 12/149,752.
U.S. Office Action mailed Aug. 29, 2013 in copending U.S. Appl. No. 12/149,752.
U.S. Notice of Allowance mailed Feb. 19, 2014 in copending U.S. Appl. No. 12/149,752.
Korean Office Action dated Mar. 25, 2014 issued in corresponding Korean Patent Application No. 10-2007-0104100.
"Informing the Design of Direct-Touch Tabletops", Chia Shen et al., IEEE Cmputer Graphics and Appplication, Sep./Oct. 2006, pp. 36-46.
U.S. Appl. No. 12/149,752, filed May 7, 2008, Vladimir Skvortsov et al., Samsung Electronics Co., Ltd.

* cited by examiner

APPARATUS AND METHOD FOR PROVIDING CONTENT

CROSS-REFERENCE TO RELATED APPLICATION

This application is a U.S. continuation application of U.S. Ser. No. 12/149,752 filed in the United States on May 7, 2008, which claims priority from Korean Patent Application No. 10-2007-0104100 filed on Oct. 16, 2007, in the Korean Intellectual Property Office, the disclosures of which are incorporated herein in their entireties by reference.

BACKGROUND OF THE INVENTION

1. Field of the Invention

The present invention relates to an apparatus and method for providing content, and more particularly to an apparatus and method for providing content that performs a web service initialization through a provided local offline web server and manages a plurality of content provided through a multithreaded web service.

2. Description of the Prior Art

The demand for information is rapidly increasing. It has become a daily event to acquire necessary information by accessing the Internet. In particular, the access and use of the World Wide Web (WWW), which supports moving images, is in high demand. In addition, through teletext broadcasting that provides diverse teletext broadcasting programs, which are provided by multiplexing text and figure information, simultaneously and repeatedly through one television broadcasting channel, information such as news, weather forecasts, television program guides, leisure information, sports, arts, real-time stock information, and so forth, is provided.

Internet TV, IPTV (Internet Protocol Television), and others, which provide a bidirectional service between a broadcasting station and a user, unlike a one-sided providing of broadcasting programs to a user, have appeared.

Here, IPTV is a service that provides an information service, moving image content, and broadcasts to a television receiver using ultrahigh-speed Internet. Since IPTV is fusion of the Internet and television, it can be considered a type of digital convergence. In comparison to existing Internet TV, IPTV uses a television receiver instead of a computer monitor, and a remote controller instead of a mouse.

There is no particular difference between IPTV and a general cable or satellite broadcast receiver in providing broadcasting content including moving images, but IPTV additionally provides a bidirectional service. That is, unlike general terrestrial wave, cable, or satellite broadcast receivers, IPTV enables a user to receive only desired programs at a convenient time.

An IPTV network for proving content through the Internet has a client/server architecture, and thus distributed web application programs provided from a remote server cannot promptly react to a user's request. Also, since a plurality of content of a user device (i.e., client) operate in series, memory management may be inefficiently performed, and an image freezing phenomenon may occur.

Accordingly, there is a need for an invention that can provide a high reaction speed even in the case of receiving a plurality of diverse content.

SUMMARY OF THE INVENTION

Accordingly, the present invention has been made to solve the above-mentioned problems occurring in the prior art, and an object of the present invention is to perform a web service initialization through a provided local offline web server, and to manage a plurality of content provided through a multithreaded web service.

Additional advantages, objects, and features of the invention will be set forth in part in the description which follows and in part will become apparent to those having ordinary skill in the art upon examination of the following or may be learned from practice of the invention.

In order to accomplish these objects, there is provided an apparatus for providing content, according to embodiments of the present invention, which includes a communication unit receiving one or more sets of content; a thread-creation unit creating one or more threads that are given to the content to process a work; and a page-creation unit having a frame per thread and creating an image page for playing the content on a web browser.

In another aspect of the present invention, there is provided a method of providing content, which includes receiving one or more sets of content; creating one or more threads that are given to the content to process a work; and providing a frame per thread and creating an image page for playing the content on a web browser.

BRIEF DESCRIPTION OF THE DRAWINGS

The above and other objects, features and advantages of the present invention will be apparent from the following detailed description taken in conjunction with the accompanying drawings, in which.

DETAILED DESCRIPTION OF THE PREFERRED EMBODIMENTS

Figure 1:
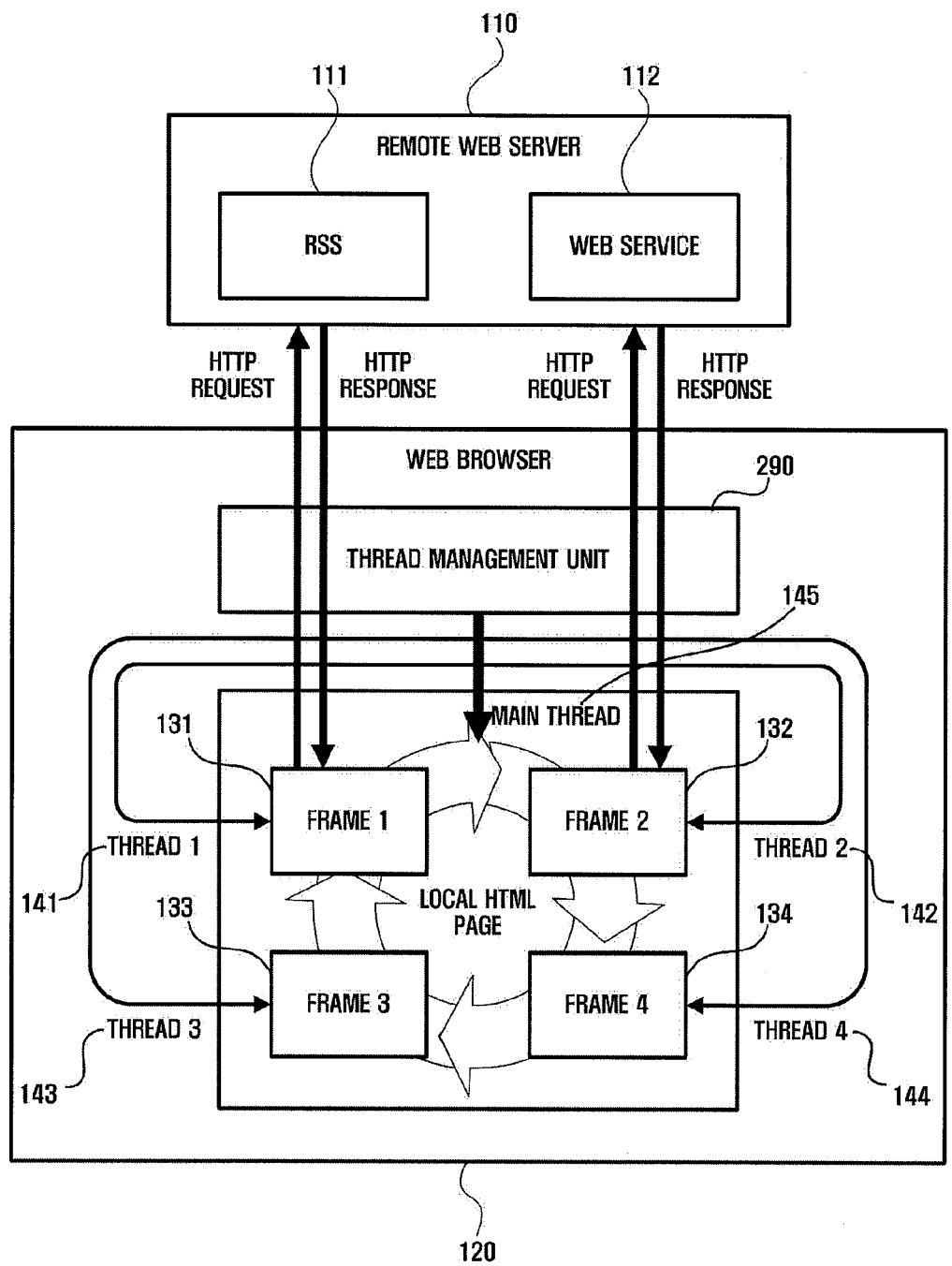
FIG. 1 is a view explaining an output of content that is provided from a remote web server on a web browser.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

In the embodiments of the present invention, the term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

FIG. 1 is a view explaining an output of content that is provided from a remote web server on a web browser.

A remote web server 110 provides content using an RSS (RDF Site Summary) 111 or a web service 112. An embodiment of the present invention discloses an apparatus for providing content processes of one or more sets of content provided from the remote web server 110 through a web browser 120 by giving separate threads 141, 142, 143, and 144 to the content, and for individually providing the processed content. Also, a main thread is given to a user interface, and it is possible to control the content by the respective threads 141, 142, 143, and 144 in accordance with a user input.

That is, one or more frames 131, 132, 133, and 134 are provided on the web browser 120, and the content, which is provided through the respective frames 131, 132, 133, and 134, is provided through individual HTTP (Hypertext Transfer Protocol) request and response processes.

Here, the content, which is provided through a specified frame, may be provided through another frame in accordance with a user selection. For this, information exchange among the threads 141, 142, 143, and 144 is performed, and a thread management unit 290 that performs the information exchange among the threads 141, 142, 143, and 144 may be provided in the apparatus for providing the content.

In addition, in the case where the content is provided through the web service, a web server that initializes the content may be provided in the apparatus for providing the content. Here, the web server is provided offline, separately from the remote web server 110, and provides the advantage in that it can efficiently manage a plurality of content. That is, the web server does not provide the content received from the remote web server 110 directly to the frames 131, 132, 133, and 134, but creates and provides new content that corresponds to the received content.

Here, the size and resolution of the newly created content may be changed to suit the frames 131, 132, 133, and 134.

In the case of receiving a JavaScript code from the remote web server 110 and performing a certain work accordingly, time for receiving the JavaScript code is required. Also, since the operation speed achieved by the JavaScript code is generally low, it is preferable to slate the work using the JavaScript code.

An image page having the frames 131, 132, 133, and 134 on the web browser 120 includes an HTML (Hypertext Markup Language) page, and the JavaScript code for constituting the image page is not received from the remote web server 110, but may have been provided inside the page. Accordingly, delay of proceeding work due to the time required for receiving the JavaScript code and the use of the JavaScript code can be prevented.

Figure 2:
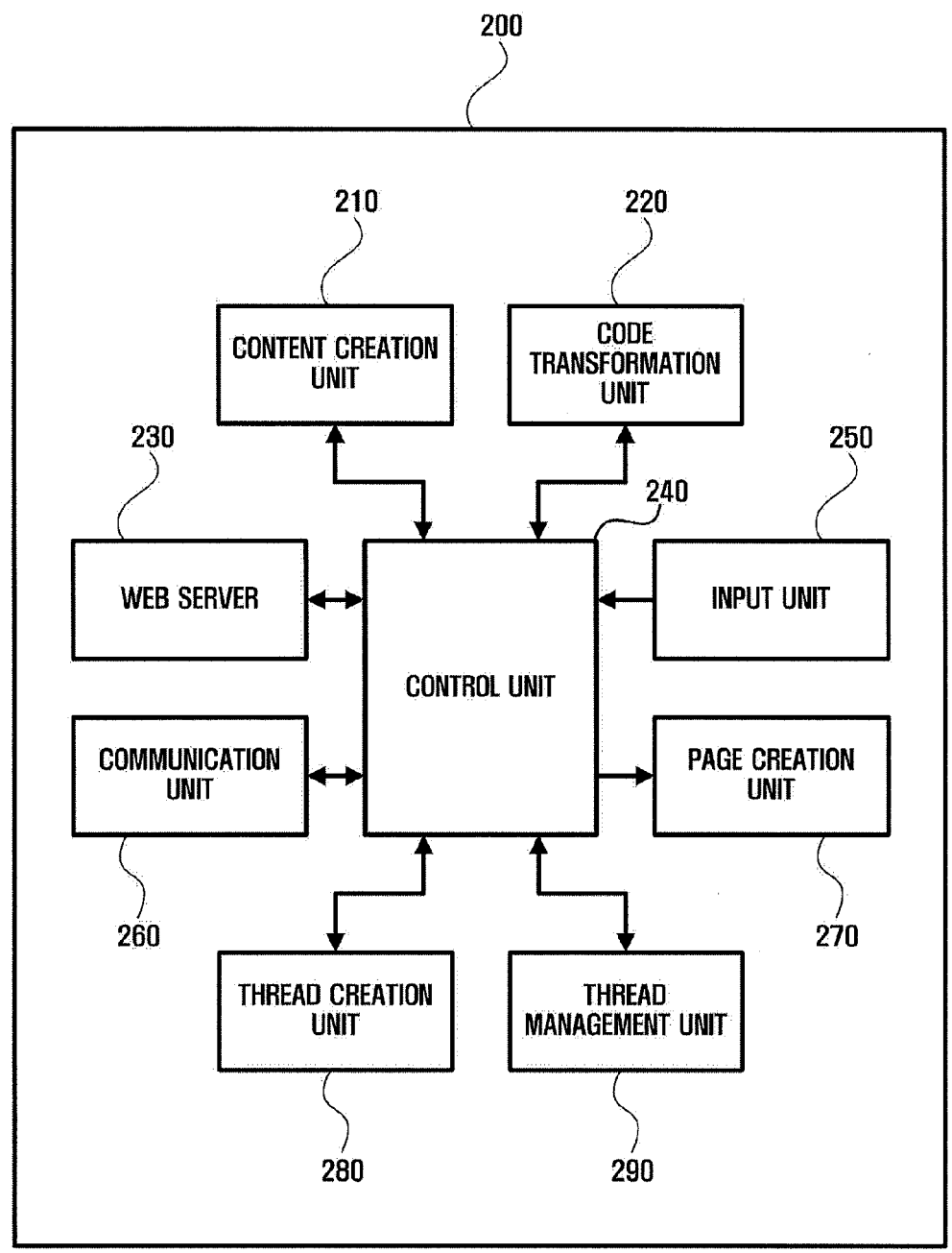
FIG. 2 is a block diagram illustrating the construction of an apparatus for providing content according to an embodiment of the present invention.

FIG. 2 is a block diagram illustrating the construction of an apparatus for providing content according to an embodiment of the present invention. An apparatus 200 for providing content according to an embodiment of the present invention includes a content creation unit 210, a code transformation unit 220, a web server 230, a communication unit 260, a control unit 240, an input unit 250, a page creation unit 270, a thread creation unit 280, and a thread management unit 290.

The communication unit 260 serves to communicate with the remote web server 110 and receive one or more sets of content. Here, a plurality of remote web servers 110 may be provided, and, in this case, the communication unit 260 can communicate simultaneously with the plurality of remote web servers 110.

The web server 230 serves to initialize the web service being provided from the remote web server 110. That is, the web server 230 internally constructs a session with the web browser 120, and exchanges an HTTP message with the web browser 120.

If the web server 230 receives an HTTP request message from the web browser 110 while it maintains the session with the web browser 120, it relays and transmits the HTTP request message to the remote web server 110, and transfers an HTTP response message that is received from the remote web server 110 to the web browser 120.

In initializing the web service, the web server 230 can initialize the content having one or more different data formats related to the same subject. Here, the same subject includes spatial information, and if specified coordinates are received from a user, the web server 230 performs the initialization of the content which is related to the corresponding coordinates and is received from the diverse remote web servers 110 on the basis of the corresponding coordinates.

For example, if a user inputs coordinates composed of latitude and longitude, the web server 230 can perform the initialization work for receiving the content such as news, traffic conditions, weather, and so forth, linked to the corresponding area, or for receiving TV program content being broadcast in the corresponding area. Here, the content may have different data formats such as HTML, XML (eXtensible Markup Language), MMS (Microsoft Media Server), and so forth.

In addition, the web server 230 can perform user authentication and user classification. The user authentication is to determine if a user is a valid user, and thus is used to judge whether an access of the content is possible or the range of accessible content in accordance with input user information. Also, the user classification is the standard for providing different kinds of content by users. For example, if the authentication of a user who belongs to a first user group is completed, the web server 230 may initialize only the content related to news and traffic conditions, and, if the authentication of a user who belongs to a second user group is completed, the web server may initialize only the content related to weather. Also, if the authentication of a user who belongs to a third user group is completed, the web server may initialize the content related to news, traffic conditions, TV programs, and weather.

In other words, the user classification is the standard for providing the content to suit the user's taste, and thus may be used to provide the content not only to correspond to the kind of content but also to suit the user's diverse tastes. For example, if a plurality of content is initially provided through a plurality of frames, an activated frame is determined according to the user classification, the size of a frame is determined, or data transmission rate for each frame is determined.

Information such as user information for the user authentication, which is inputted by the user, is inputted through the input unit 250. The input unit 250 is provided with buttons, a wheel, a jog shuttle, and so forth, for receiving the information from the user. Also, if a display unit (not illustrated) of the content-providing apparatus 200 provides a touch screen function, the display unit may serve as the input unit 250. For example, in the case of inputting coordinates, the user inputs figures or characters using the buttons, or selects a specified position of the display unit.

Here, the input unit 250 may be a separate device. For example, a wireless remote controller may serve as the input unit 250. That is, using the button or wheel provided in the wireless remote controller, the user can input the information, and if an inertia sensor is provided in the wireless remote controller, the user can input the information that corresponds to a moving trace of the wireless remote controller.

The content creation unit 210 serves to create new content based on the content received from the remote web server 110. In this case, the content creation unit 210 can create the content of which the size and resolution are changed to suit the frame, with respect to the received content, and can change the received content with reference to the user classification.

In addition, the content creation unit 210 can change the content in consideration of the network state, the available memory capacity, and the processing capability. For example, the content creation unit 210 can change the size or resolution of the received content or the number of frames provided per unit time to suit the network state, the available memory capacity, and the processing capability.

The web service may be provided on the basis of XML, SOAP (Simple Object Access Protocol), and WSDL (Web Services Description Language) protocols.

XML is the standard for W3C text-based markup language, and can represent various kinds of expressions and data using tags in a manner different from that of the HTML. The XML is useful for describing the structured data having a high portability, and is mainly used to describe the data. In particular, the XML is mainly used as a data format that requires mutual exchange with a messaging protocol.

The SOAP is an XML-based light-weight protocol devised for the purpose of information exchange in a distributed environment, and defines the messaging protocol between a service user and a service provider. Also, the SOAP provides a standardized method capable of calling a remote service through the XML-based messaging, irrespective of the platform, operating system, or programming language of the service to be provided.

WSDL describes service connection information provided by a web service provider using XML, i.e., a service interface such as a message form exchanged during binding and operation information provided by the web service provider.

Also, as described above, the content may be received in MMS form, and the code transformation unit 220 serves to transform the web service code received in diverse forms into HTML code.

The thread creation unit 280 is given to the respective content, and serves to create one or more threads for processing the work. That is, the work for the respective content may be processed by threads individually provided, and thus the content can be provided in parallel.

Also, the thread creation unit 280 can create threads for a user interface work. The user can perform a network search using the user interface, and the thread for the user interface work may be created as a main thread 145.

The thread management unit 290 serves to manage a mutual work among a plurality of threads. For example, the thread management unit 290 performs resource allocation in consideration of the kind of content that is processed by threads. Also, the thread management unit 290 may perform content switchover among frames. For example, the first content being played through a first frame may be played through a second frame, and the second content being played through a second frame may be played through the first frame.

Figure 3:
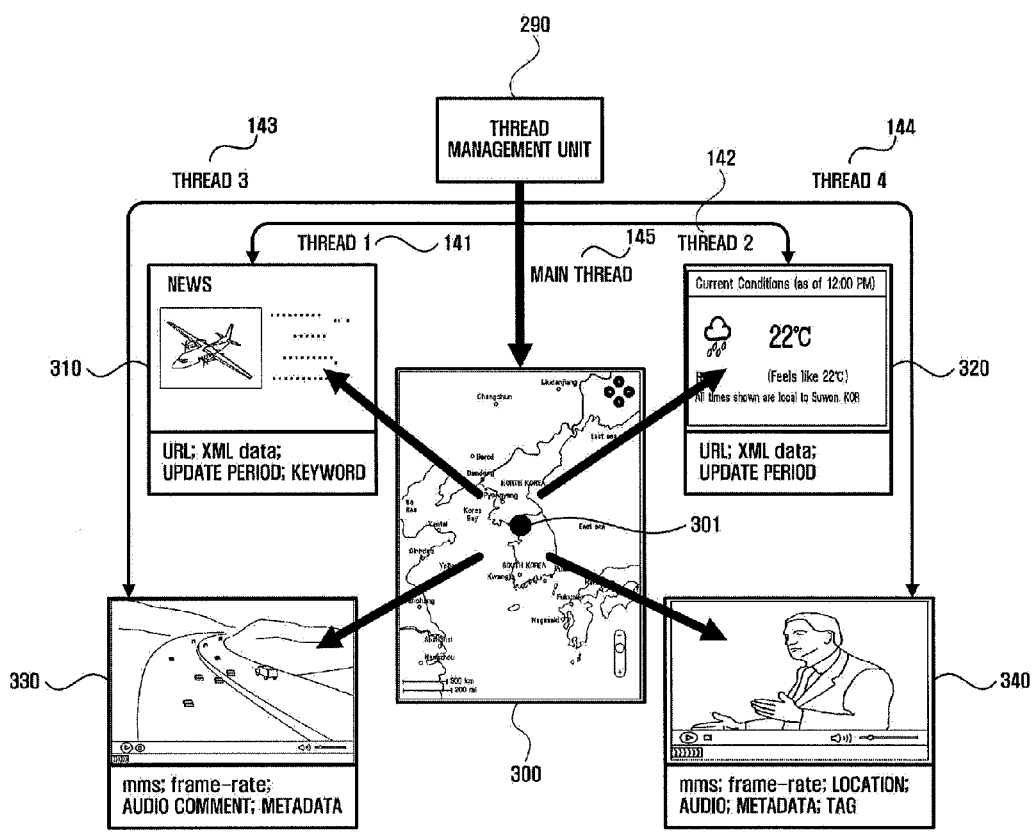
FIG. 3 is a view explaining processing of content through a plurality of threads according to an embodiment of the present invention.

FIG. 3 is a view explaining processing of content through a plurality of threads according to an embodiment of the present invention. Referring to FIG. 3, the work for the corresponding content 310, 320, 330, and 340 is processed by the respective threads 141, 142, 144, and 145 created by the thread creation unit 280.

Here, as the thread for processing the work for the user interface is created as the main thread 145, the work command inputted by the user is directly connected to the work process by the respective threads 141, 142, 143, and 144.

FIG. 3 shows that a plurality of content 310, 320, 330, and 340 for a specified area selected by the user is played. That is, the user can select a specified point 301 of a screen 300 through the input unit 250. The coordinates of the selected point 301 are transformed into latitude and longitude, and then content information that corresponds to the transformed coordinates is extracted. For example, as illustrated in FIG. 3, information on RSS news, RSS weather, traffic conditions, and TV channel is extracted. The RSS news information includes a URL (Uniform Resource Locator), an update period, and a keyword. The RSS weather information includes a URL and an update period. The traffic condition information includes an MMS address, a frame rate, whether an audio comment is supported, and metadata. The TV channel information includes an MMS address, a frame rate, a position, whether audio is supported, metadata, and a tag. The content information may be stored in the content-providing apparatus 200 or an external device. For this, the content-providing apparatus 200 may be provided with a storage means (not illustrated).

As the content information is extracted, the respective threads play the received content 310, 320, 330, and 340 through the corresponding frames using the corresponding content information. The content information may be updated by the user or the remote web server 110.

Referring again to FIG. 2, the page creation unit 270 is provided with frames by threads and serves to create an image page for playing the content. In creating the image page, the page creation unit 270 may prevent the time required for receiving the JavaScript code and the delay of proceeding work from occurring by inserting minimum JavaScript codes provided to provide the content into the image page.

Figure 4:
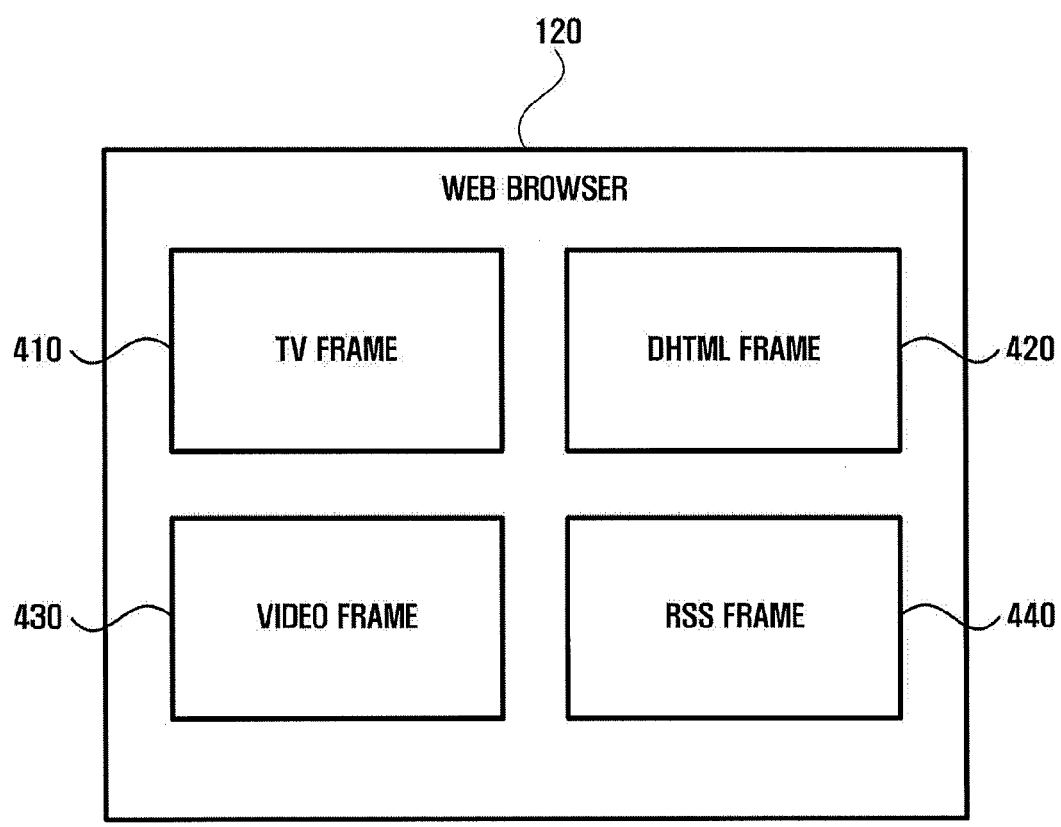
FIG. 4 is a view illustrating a plurality of frames that constitute a web browser according to an embodiment of the present invention.

FIG. 4 is a view illustrating a plurality of frames that constitute a web browser according to an embodiment of the present invention. The page creation unit 270 creates the image page composed of a plurality of frames 410, 420, 430, and 440, which can play different types of content, on the web browser 120.

Figure 5:
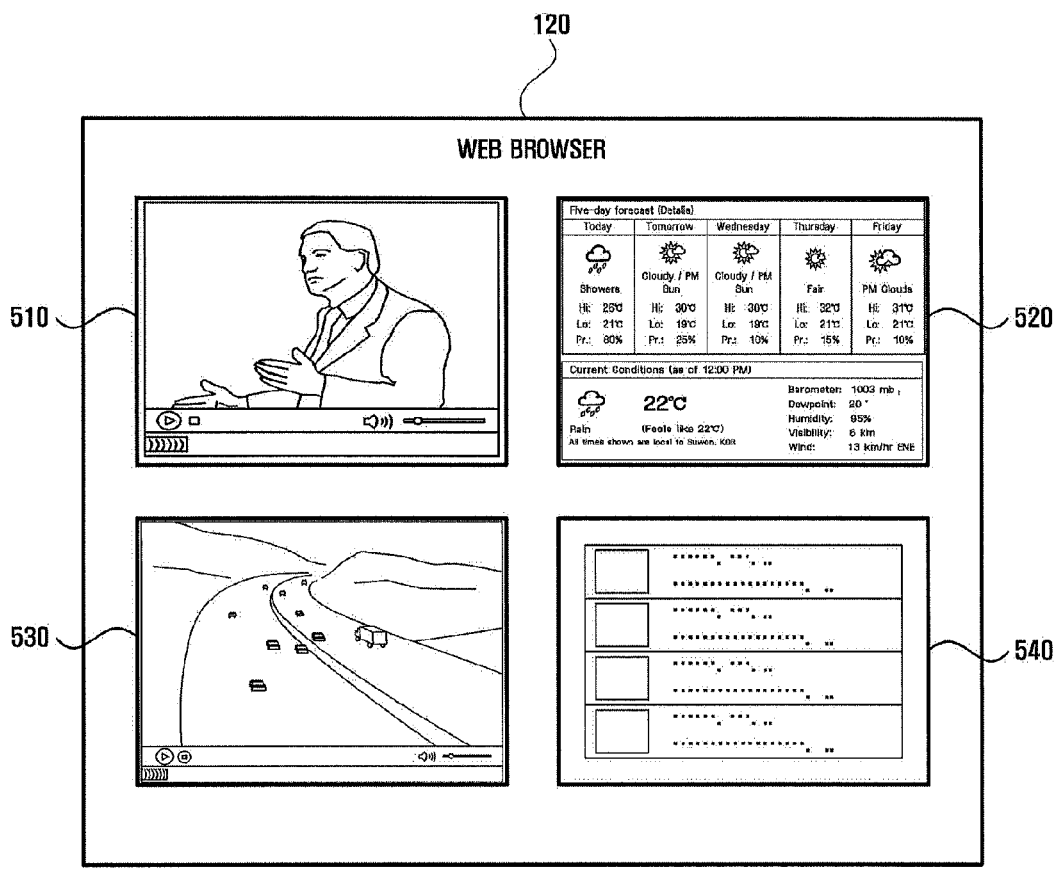
FIG. 5 is a view explaining an output of content that corresponds to respective frames of FIG. 4.

As the image page is created by the page creation unit 270, as illustrated in FIG. 5, content 510, 520, 530, and 540 are played through the respective frames 410, 420, 430, and 440 by separate threads. Accordingly, even if a problem occurs in one of the content 510, 520, 530, and 540 being played through the frames 410, 420, 430, and 440, the play of the remaining content can be guaranteed.

Also, since the thread management unit 290 manages resources used by the respective threads, unnecessary occupation of the resources by the respective content can be prevented and much more resources can be allocated to the content that greatly require the resources.

In contrast, the user can allocate much more resources to specified content in accordance with the user's selection. Also, content that requires much more resources may occur in accordance with the kind of content, and in this case, the thread management unit 290 can allocate much more resources to the corresponding content. For example, since the content such as the traffic conditions or TV channels requires much more network resources, memory resources, and processing resources, the thread management unit 290 allocates much more resources to such content with reference to the extracted content information.

Referring again to FIG. 2, the control unit 240 performs the whole control of the web server 230, the communication unit 260, the content creation unit, the code transformation unit, the thread creation unit 280, the thread management unit 290, the input unit 250, the page creation unit 270, and the content-providing apparatus 200.

Figure 6:
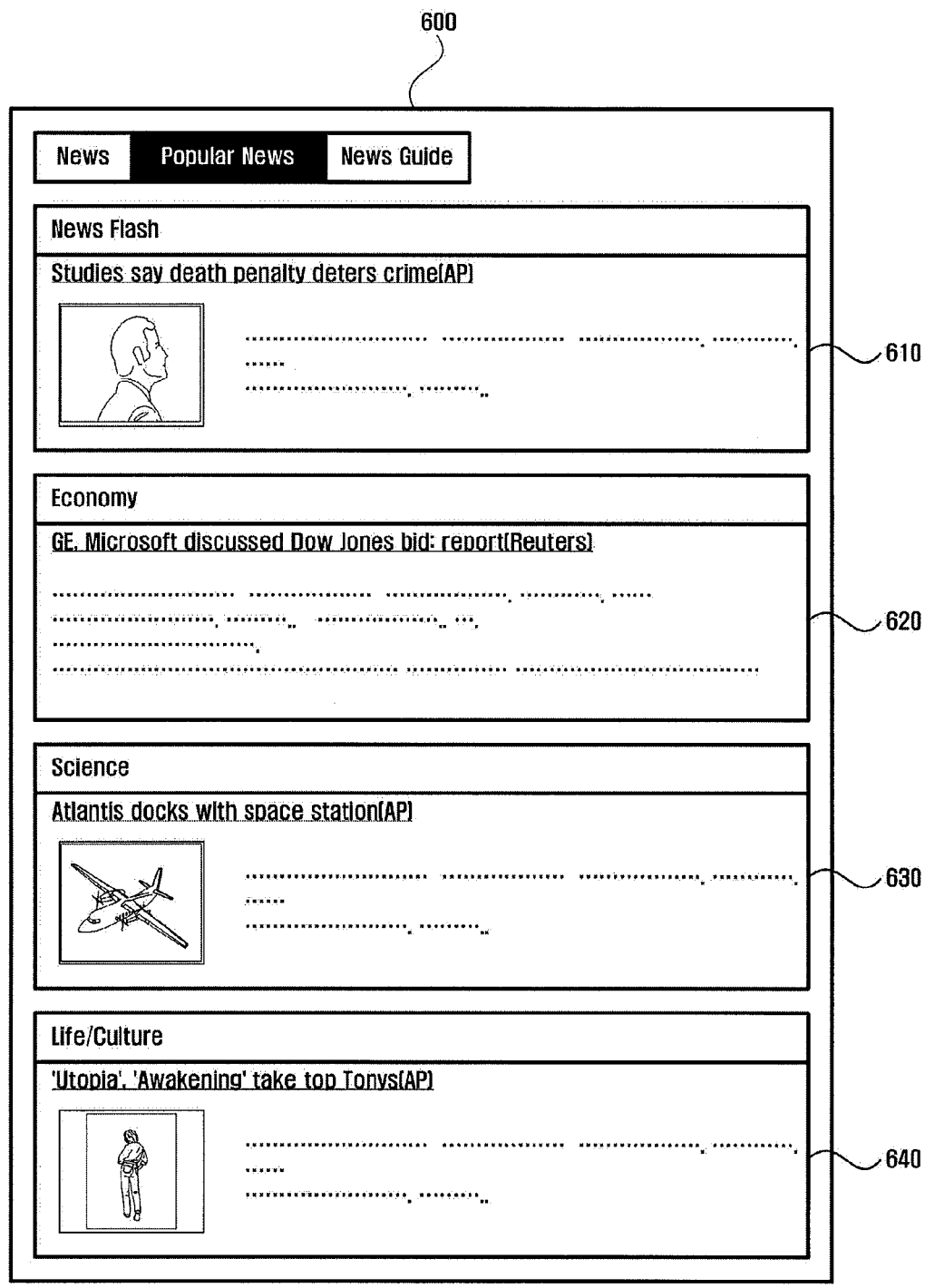
FIG. 6 is a view explaining processing of content through a plurality of threads according to another embodiment of the present invention.

FIG. 6 is a view explaining processing of content through a plurality of threads according to another embodiment of the present invention. As illustrated in FIG. 6, news content 600 provided through the RSS 11 is separated by categories and then provided.

As illustrated in FIG. 6, the news content 600 provided through the RSS 111 may be classified into a latest news column, a financial column, a scientific column, and a living/culture column, and the individual thread that corresponds to the respective category receives and plays the initial page of the corresponding category from the remote web server 110.

Here, the content 610, 620, 630, and 640 divided by categories may be received from one remote web server 110 or from different remote web servers 110, and the respective content 610, 620, 630, and 640 can be periodically updated.

Figure 7:
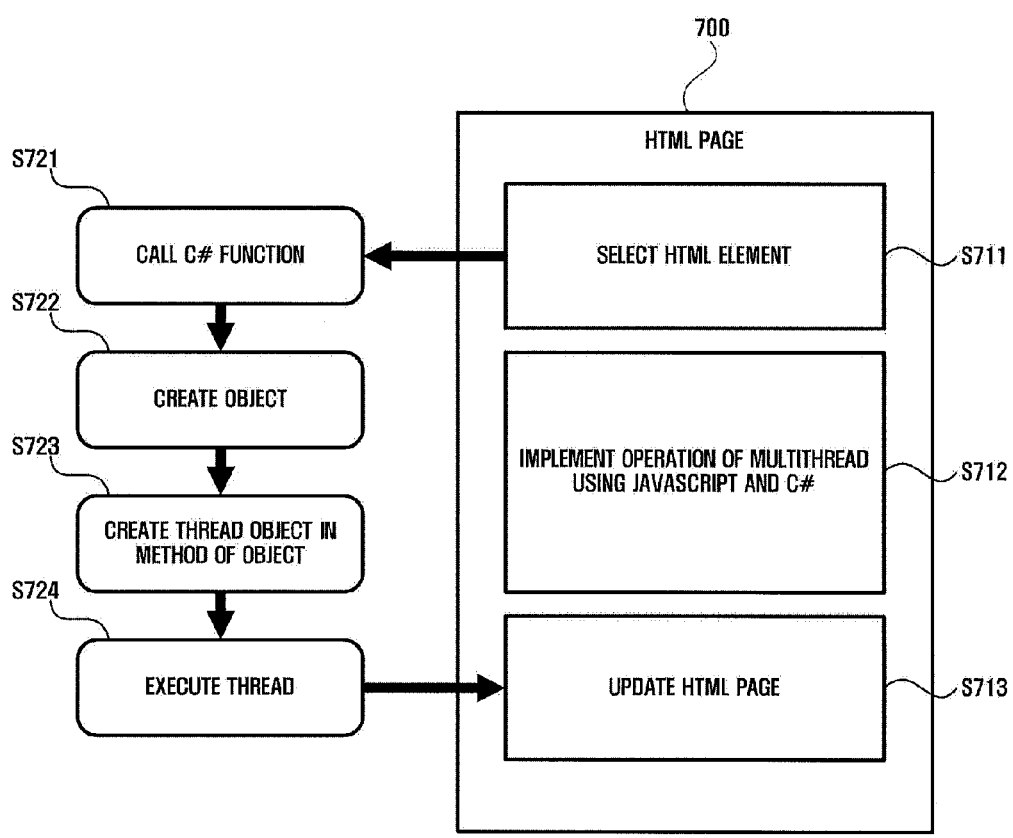
FIG. 7 is flowchart illustrating a process of creating threads on a web browser through a code of a page according to an embodiment of the present invention.

FIG. 7 is flowchart illustrating a process of creating threads on a web browser through a code of a page according to an embodiment of the present invention. In FIG. 7, threads are created through C#.

First, if an element of an HTML page 700 is selected S711, C# function is called S721. For example, if a user interface, such as an icon implemented by a JavaScript function and so on, is selected by the user, the C# function is called. Here, the calling of the C# function may be understood as an initialization process for creating the threads using C#.

When the initialization process is completed, i.e. when the thread creation function is called, an object is created by the thread creation function S722. If the creation of the object is completed, a method that is an operation function for the object is created, and in particular, a thread object is created in the method S723.

Then, if the created thread object is executed, an HTML page 700 is updated by the Control.Invoke method S713. From this time, the content playback performed by the threads starts, and a multi-thread operation by the JavaScript and C# is executed S712.

Figure 8:
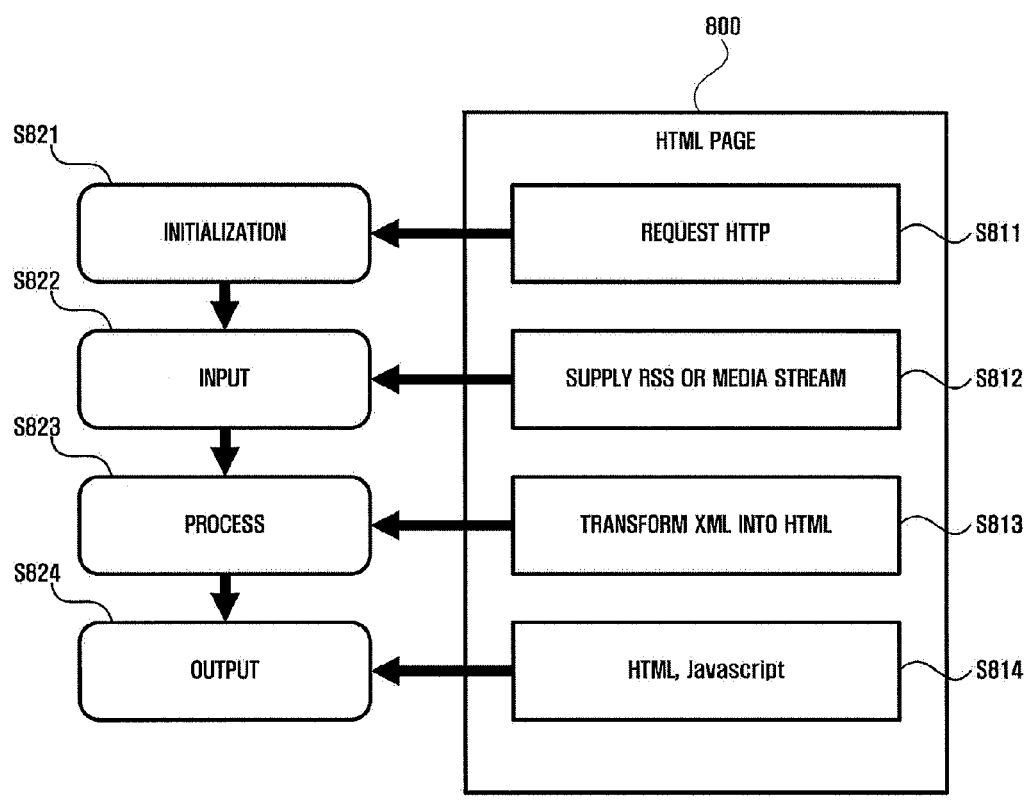
FIG. 8 is a flowchart illustrating a process of providing content on a web browser through a code of a page according to an embodiment of the present invention.

FIG. 8 is a flowchart illustrating a process of providing content on a web browser through a code of a page according to an embodiment of the present invention.

In order to play the content, the HTML page 800 first makes an HTTP request to the web server 230 S811. The HTTP request may be performed by the JavaScript, ActiveX, or web control Windows form, or others.

As the HTTP request is performed, the web server 230 performs the initialization work for the content playback S821. For example, the user authentication or the user classification is performed, and memory and network resources are allocated or image frames are created.

In response to the HTTP request, XML-type content or a media stream is supplied through the RSS 111 S812, and the supplied content is inputted to the threads S822.

As the XML type content is supplied, the HTML page 800 calls a function for transforming XML into HTML S813, and thus the thread performs the transformation work S823. For the transformation, XLST (Extensible StyleSheet Language Transformations) or CSS (Cascading Style Sheet) may be used.

The transformed content is provided S824, and the HTML page 800 plays the corresponding content through a specified frame using HTML or JavaScript S814.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A display apparatus for providing content, the apparatus comprising:
   a communication unit to receive a plurality of contents;
   a page creation unit to create a plurality of frames for a plurality of threads, respectively, and to create an image page for playing the plurality of contents in the plurality of frames;
   a content creation unit to create contents based on the plurality of contents;
   a display unit to display a plurality of images corresponding to the created contents; and
   a processing unit to determine an amount of resources for each of a plurality of threads based on information of the plurality of contents, and to allocate resources to each of the plurality of threads according to the determined amount of resources for each of the plurality of threads, respectively,
   wherein a size and resolution of each of the created contents are changed to suit each of the frames.

2. The apparatus of claim 1, wherein the plurality of contents have a same subject.

3. The apparatus of claim 1, further comprising a thread creation unit to create the plurality of threads.

4. The apparatus of claim 3,
   wherein the thread creation unit creates a main thread for a work of a user interface, and
   wherein the main thread performs a network search directed by a user using the user interface.

5. The apparatus of claim 1, wherein the processing unit manages a mutual work among the plurality of threads.

6. The apparatus of claim 1, further comprising a web server to initialize at least one web service that provides the plurality of contents, wherein the web server is a local offline web server.

7. The apparatus of claim 6, wherein the web server performs a user authentication and a user classification.

8. The apparatus of claim 1, wherein the page creation unit creates the image pages on a web browser.

9. A method for providing content, the method comprising:
   receiving a plurality of contents;
   creating a plurality of frames for a plurality of threads, respectively;
   creating an image page for playing the plurality of contents in the plurality of frames;
   creating contents based on the plurality of contents;
   displaying a plurality of images corresponding to the created contents;
   determining an amount of resources for each of a plurality of threads based on information of the plurality of contents; and
   allocating resources to each of the plurality of threads according to the determined amount of resources for each of the plurality of threads, respectively,
   wherein a size and resolution of each of the created contents are changed to suit each of the frames.

10. The method of claim 9, wherein the plurality of contents have a same subject.

11. The method of claim 9, further comprising creating the plurality of threads.

12. The method of claim 11,
   wherein the creating of the plurality of threads comprises creating a main thread for a work of a user interface, and
   wherein the main thread performs a network search directed by a user using the user interface.

13. The method of claim 9, wherein further comprising managing a mutual work among the plurality of threads.

14. The method of claim 9, further comprising initializing at least one web service that provides the plurality of content using a local offline web server.

15. The method of claim 14, wherein the web server performs a user authentication and a user classification.

16. The method of claim 9, wherein the creating the plurality of image pages comprises creating the plurality of image pages on a web browser.

* * * * *